United States Patent
Omote et al.

(10) Patent No.: US 9,434,306 B2
(45) Date of Patent: Sep. 6, 2016

(54) NOTIFICATION SOUND CONTROL UNIT OF APPROACHING VEHICLE AUDIBLE SYSTEM

(75) Inventors: Asako Omote, Tokyo (JP); Takahisa Aoyagi, Tokyo (JP); Ryotaro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 52 days.

(21) Appl. No.: 14/370,684

(22) PCT Filed: Mar. 16, 2012

(86) PCT No.: PCT/JP2012/056831
§ 371 (c)(1),
(2), (4) Date: Nov. 18, 2014

(87) PCT Pub. No.: WO2013/136505
PCT Pub. Date: Sep. 19, 2013

(65) Prior Publication Data
US 2015/0061850 A1     Mar. 5, 2015

(51) Int. Cl.
*B60Q 1/00*    (2006.01)
*B60Q 5/00*    (2006.01)

(52) U.S. Cl.
CPC .................................. *B60Q 5/008* (2013.01)

(58) Field of Classification Search
CPC ........ B60Q 5/008; B60Q 5/00; G10K 15/02; B60G 17/0195; B60G 2400/823; B60G 2800/242; B60W 10/06; B60W 10/184; B60W 10/22; B60W 2510/22; B60W 2520/10; B60W 2540/10; B60W 2540/12; B60W 2550/12
USPC ........ 340/425.5, 428–429, 426.23, 435, 436, 340/438, 439, 447, 463, 468, 539.26
See application file for complete search history.

(56) References Cited

U.S. PATENT DOCUMENTS

| 2006/0279294 | A1* | 12/2006 | Cehelnik | ................ G08B 13/26 324/662 |
| 2010/0166210 | A1* | 7/2010 | Isozaki | ..................... B60L 3/00 381/86 |
| 2010/0222960 | A1* | 9/2010 | Oida | .................. B60G 17/0195 701/31.4 |
| 2012/0130580 | A1 | 5/2012 | Omote et al. | |

(Continued)

FOREIGN PATENT DOCUMENTS

| JP | 07-032948 A | | 2/1995 |
| JP | 2005-075182 A | | 3/2005 |
| JP | 2009-035195 | * | 2/2009 |
| JP | 2009-035195 A | | 2/2009 |

(Continued)

*Primary Examiner* — Daniel Previl
(74) *Attorney, Agent, or Firm* — Birch, Stewart, Kolasch & Birch, LLP

(57) ABSTRACT

A notification sound control unit (10) of an approaching vehicle audible system (100), generating a signal for a notification sound to be emitted from a sounding device (40) provided in an electric vehicle (200) in which at least part of driving force is produced by a motor to the outside of the electric vehicle (200), is provided with a behavior conversion processing section (21) that changes through time change processing an accelerator opening degree signal (11) among vehicle information signals (1) of the electric vehicle (200) so as to output a processed accelerator opening degree signal and with a notification sound signal generation processing section (3) that changes a pitch and a volume of a sound element signal outputted from a sound element (31, 310), based on the processed accelerator opening degree signal, so as to generate a notification sound signal.

9 Claims, 17 Drawing Sheets

(56) References Cited

U.S. PATENT DOCUMENTS

2012/0182136 A1* 7/2012 Nakayama ............ B60Q 5/008
340/425.5
2013/0157729 A1* 6/2013 Tabe ................ H04W 52/0245
455/573

FOREIGN PATENT DOCUMENTS

| JP | 2010-155507 A | 7/2010 |
|---|---|---|
| JP | 2011-037350 A | 2/2011 |
| JP | 2011-183979 A | 9/2011 |
| JP | 4794699 B1 | 10/2011 |

* cited by examiner

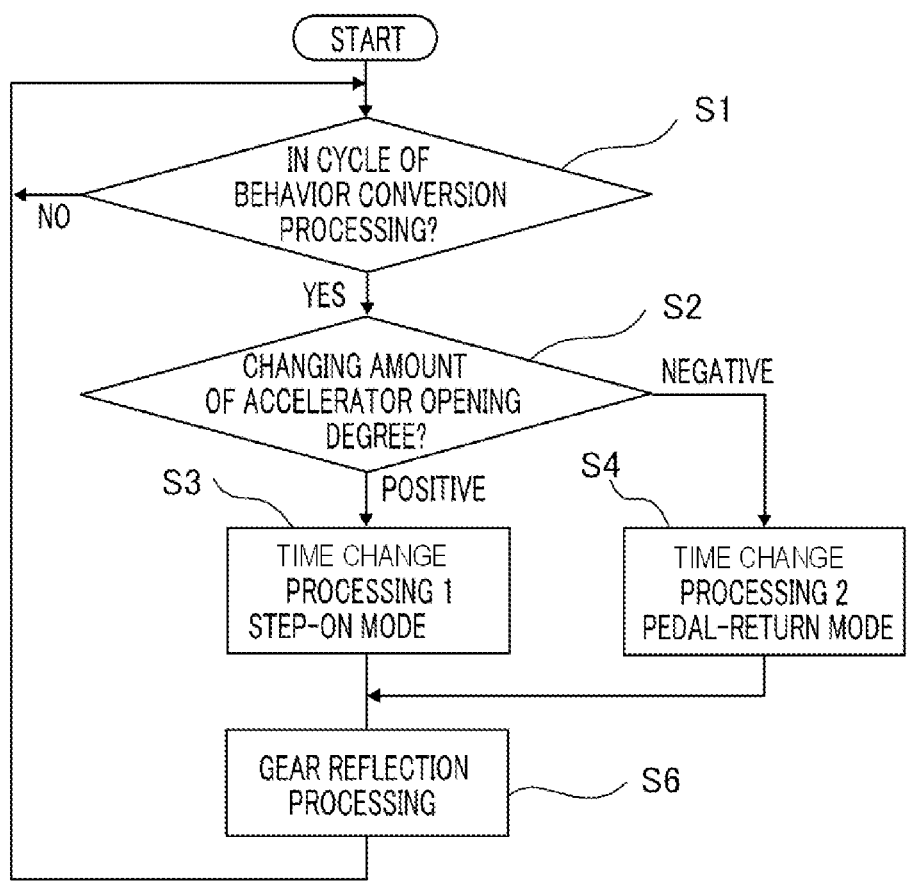

NOTIFICATION SOUND CONTROL UNIT OF APPROACHING VEHICLE AUDIBLE SYSTEM

TECHNICAL FIELD

The present invention relates to an approaching vehicle audible system that generates a sound in a high-quietness electric vehicle such as a hybrid automobile or an electric automobile so as to notify a pedestrian or the like of the existence of the electric vehicle, and particularly to signal generation for its notification sound.

BACKGROUND ART

In recent years, as various kinds of movable bodies, vehicles such as a motorcycle, an automobile, and the like have been electrified after development and practical realization of an electric bicycle, an electric cart, and the like. Specifically, while replacing an automobile that utilizes an internal combustion engine as its driving power source, a hybrid automobile, which utilizes a gasoline engine and an electric motor as its driving power source, an electric automobile, which utilizes, as its driving power source, an electric motor that operates with a domestic electric power source or a battery to be charged through an electric charger installed at a gas station or an electric power supply station, and a fuel cell automobile, which travels while generating electricity through a fuel cell that utilizes hydrogen gas or the like, as a fuel, have sequentially been developed; a hybrid automobile and an electric automobile have already been put to practical use and have started to spread.

In the case of each of a gasoline vehicle, a diesel vehicle, and a motorcycle (hereinafter, described as "a conventional automobile and the like") that each utilize a conventional internal combustion engine as the driving power source therefor, an engine sound and an exhaust sound, which are emitted by the driving power source itself, and road noise or the like during its travel are generated; therefore, a pedestrian walking in a town, a cyclist, or the like can be aware of approach of a vehicle through an engine sound, an exhaust sound, or the like. However, because during a low-speed travel, a hybrid automobile travels mainly by means of not an engine but an electric motor, no engine sound or exhaust sound is generated, and an electric automobile, a fuel cell automobile, and the like each travel by means of an electric motor in the whole driving region; thus, any one of these automobiles is extremely high-quietness electric vehicle. However, a pedestrian or a cyclist in the vicinity of such a high-quietness electric vehicle cannot perceive through a sound an approach of the electric vehicle such as a hybrid automobile, an electric automobile, or a fuel cell automobile that travels by means of a less-sound-noise and high-quietness electric motor; therefore, this may become the cause of a minor collision between the high-quietness electric vehicle and the pedestrian or the like.

Accordingly, in order to solve the foregoing problem in which the quietness, which is originally a merit of each of a hybrid automobile, a fuel cell automobile, and an electric automobile, there have been proposed various kinds of approaching vehicle audible systems, other than a horn that is provided in a conventional automobile or the like and sounds an alarm in accordance with the will of a driver, that is to notify a pedestrian in the vicinity of a reference vehicle of the existence of the reference vehicle.

Some of the approaching vehicle audible systems make a sound that resembles a conventional engine sound, as a notification sound for notify a pedestrian or the like of the existence of a reference vehicle. For example, an approaching vehicle audible system disclosed in Patent Document 1 is provided with a function unit that converts information, other than an approach alarm sound, that is superimposed on an approach alarm sound, into an acoustic signal and a modulation unit that superimposes the acoustic signal on the approach alarm sound so as to create a sound signal. An approaching vehicle audible system disclosed in Patent Document 2 creates by use of a computer a pseudo sound signal having a frequency corresponding to a motor rotation speed and an amplitude corresponding to an accelerator opening degree and a pseudo sound signal having a frequency corresponding to a vehicle speed detected by a vehicle speed sensor and an amplitude corresponding to an accelerator opening degree and then outputs either one of the pseudo sound signals through a speaker, by way of an amplifier. Selection between the pseudo sound based on a motor rotation speed and the pseudo sound based on a vehicle speed is made through a switch. Patent Document 2 discloses that both the pseudo sound based on a motor rotation speed and the pseudo sound based on a vehicle speed may concurrently be outputted.

Patent Document 3 discloses a technology that determines especially the urgency degree of braking operation, based on information items on an accelerator and a brake, and then controls an alarm sound. Patent Document 4 discloses a technology that stores a matching table including an accelerator opening degree and the virtual engine rotation speed based on the accelerator opening degree so as to obtain a virtual engine rotation speed corresponding to an accelerator opening degree and an elapsed time.

PRIOR ART REFERENCE

Patent Document

[Patent Document 1] Japanese Patent Application Laid-Open No. 2011-37350

[Patent Document 2] Japanese Patent Application Laid-Open No. H7-32948

[Patent Document 3] Japanese Patent Application Laid-Open No. 2005-75182

[Patent Document 4] Japanese Patent Application Laid-Open No. 2010-155507

DISCLOSURE OF THE INVENTION

Problems to be Solved by the Invention

The intention of a driver is firstly reflected in a change of an accelerator opening degree signal. Therefore, reflection of the accelerator opening degree signal in a change of a notification sound makes an attention-seeking signal most quickly outputted to the vicinity. Meanwhile, the technologies disclosed in the foregoing Patent Documents have the following problem. That is to say, there exists a problem that when an accelerator opening degree signal is directly reflected in a notification sound, an excessively quick change in acceleration work produces an unnatural sound.

The present invention has been implemented in order to solve the foregoing problem in a conventional approaching vehicle audible system; the objective thereof is to provide an approaching vehicle audible system that can generate a more natural notification sound through simple control and that generates a notification sound with which a pedestrian or the like can be aware of the existence of an electric vehicle with a more natural sense and can autonomously behave against a danger.

Means for Solving the Problems

In the present invention, a notification sound control unit of an approaching vehicle audible system, generating a signal for a notification sound to be emitted from a sounding device provided in an electric vehicle in which at least part of driving force is produced by an electric motor to the outside of the electric vehicle, is provided with a behavior conversion processing section that changes through time change processing an accelerator opening degree signal among vehicle information signals of the electric vehicle so as to output a processed accelerator opening degree signal and a notification sound signal generation processing section that changes a pitch and a volume of a sound element signal outputted from a sound element, based on the processed accelerator opening degree signal, so as to generate a notification sound signal.

Advantage of the Invention

The present invention makes it possible that as the notification sound of an electric vehicle, a more natural sound is emitted in various kinds of modes of the vehicle; thus, because a pedestrian and like perceive the existence of the electric vehicle with a sense approximately the same as the sense for a conventional automobile, an autonomous danger-avoiding behavior can be taken.

BRIEF DESCRIPTION OF THE DRAWINGS

FIG. 20 is a flowchart representing the operation of the behavior conversion processing section in the notification sound control unit of the approaching vehicle audible system according to Embodiment 5 of the present invention.

EMBODIMENTS FOR CARRYING OUT THE INVENTION

Embodiment 1

Figure 2:
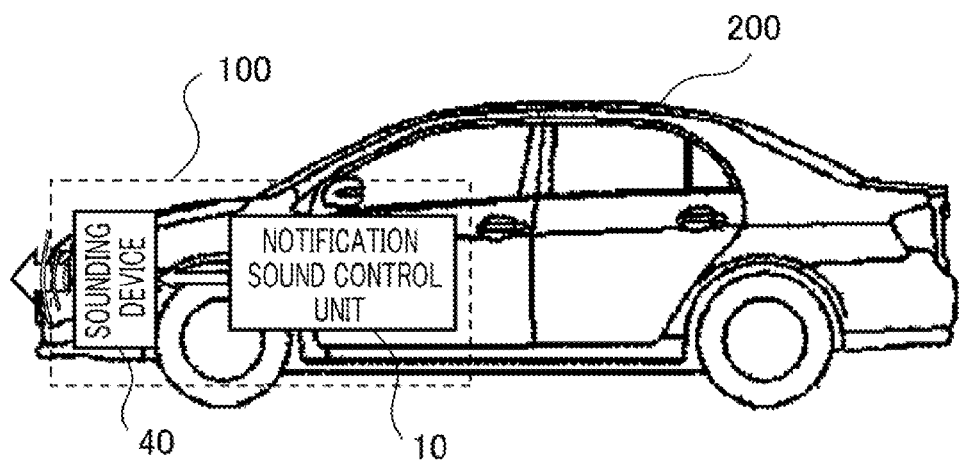
FIG. 2 is a conceptual view of an approaching vehicle audible system to which a notification sound control unit of an approaching vehicle audible system according to the present invention is applied.
Figure 3:
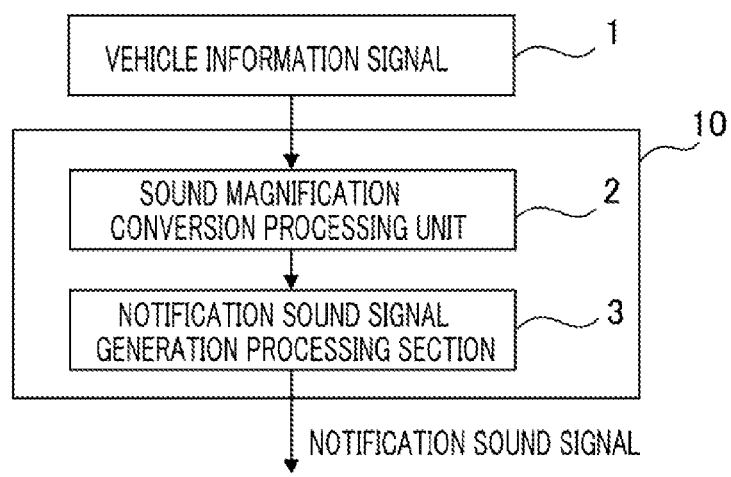
FIG. 3 is a block diagram representing the schematic configuration of a notification sound control unit of an approaching vehicle audible system according to the present invention.

FIG. 2 illustrates a conceptual view of an approaching vehicle audible system; FIG. 3 represents a block diagram of the schematic configuration of a notification sound control unit of an approaching vehicle audible system according to the present invention. An approaching vehicle audible system 100 is provided in an electric vehicle 200, such as an electric automobile or a hybrid automobile, that generates at least part of driving force by means of an electric motor. The approaching vehicle audible system 100 is provided with a notification sound control unit 10 that outputs a notification sound signal and a sounding device 40, such as a speaker, that emits a notification sound outside the vehicle in accordance with the notification sound signal. The notification sound control unit 10 is provided with a sound magnification conversion processing unit 2 that performs sound magnification conversion processing by use of a vehicle information signal 1 and a notification sound signal generation processing section 3; the notification sound control unit 10 outputs the notification sound signal. In this "description", a sound to be emitted outside a reference vehicle for the purpose of notifying a pedestrian or the like of the existence of the reference vehicle will be referred to as a notification sound. The notification sound in this "description" is a sound that reminds a pedestrian of the traveling status of a vehicle; the notification sound may be a sound that reminds a pedestrian of the engine sound of a conventional automobile or a sound that does not remind a pedestrian of the engine sound of a conventional automobile.

The vehicle information signal 1 is a signal of information that indicates a vehicle behavior obtained from a vehicle. The vehicle information signal 1 utilized in the notification sound control unit 10 includes at least an accelerator opening degree signal. The vehicle information signal 1 may include only the accelerator opening degree signal; alternatively, in addition to the accelerator opening degree signal, it may include one or more signals that each indicate the behavior of a vehicle. The vehicle information signal 1 may be a signal that is obtained through a hard wire or a signal that is obtained through vehicle communication such as a CAN (Controller Area Network) or a LIN (Local Interconnect Network).

The notification sound signal generation processing section 3 applies pitch and volume changing processing to a basic sound signal, i.e., a sound element signal so as to output the notification sound signal. The sound magnification conversion processing unit 2 outputs to the notification sound signal generation processing section 3 the magnifications of pitch and volume for changing the pitch and the volume. In order to change a notification sound in conjunction with a signal obtained from the vehicle information signal 1, the sound magnification conversion processing unit 2 calculates the magnifications of pitch and volume, based on the vehicle information signal 1 and then outputs these magnifications. Moreover, the sound magnification conversion processing unit 2 applies behavior conversion processing to the vehicle information signal 1 so as to generate a notification sound that resembles a more real vehicle behavior.

Figure 1:
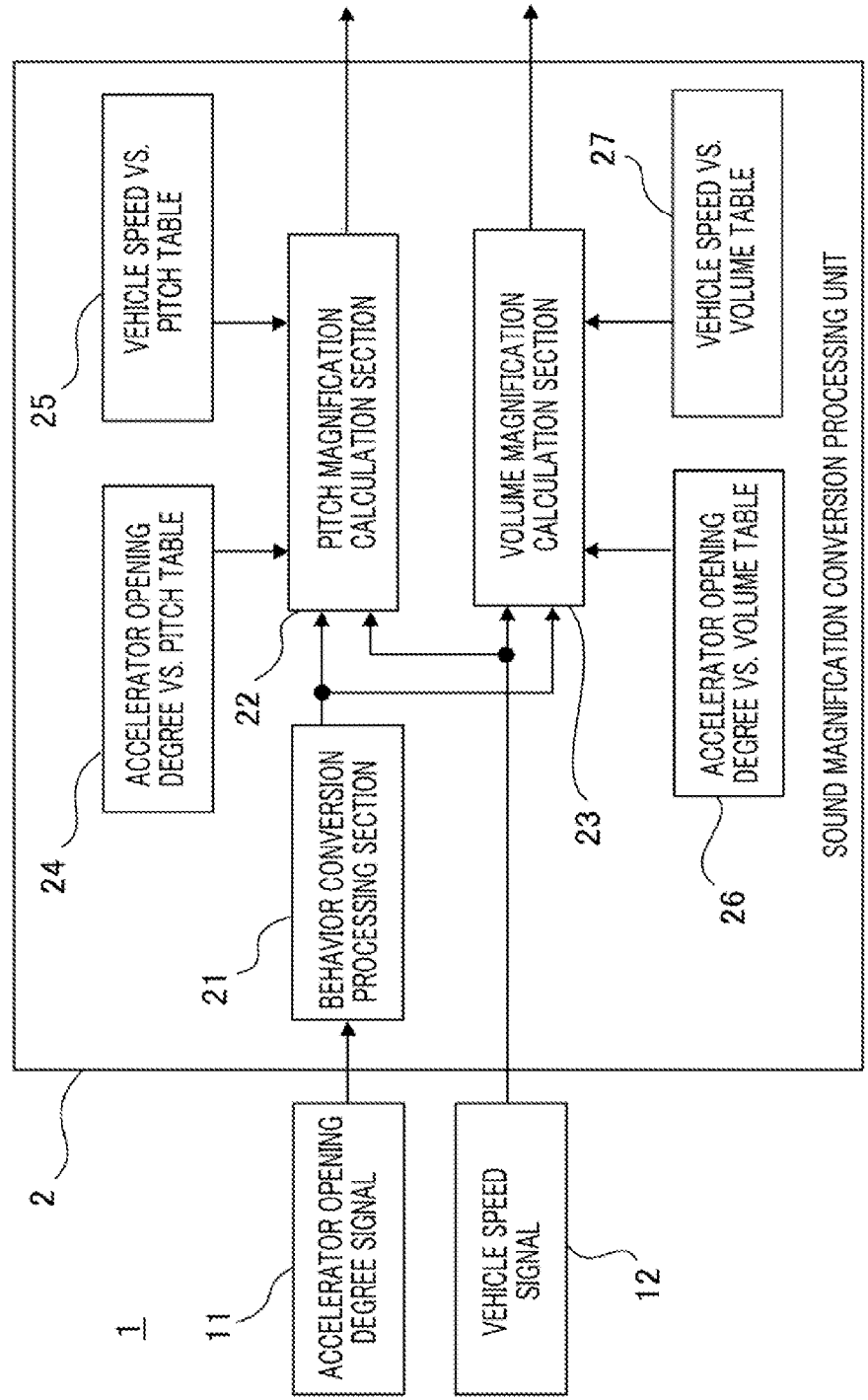
FIG. 1 is a block diagram representing the internal configuration of a sound magnification conversion processing unit in a notification sound control unit of an approaching vehicle audible system according to Embodiment 1 of the present invention.

FIG. 1 is a block diagram representing the internal configuration of the sound magnification conversion processing unit 2 according to Embodiment 1. The sound magnification conversion processing unit 2 is configured with a behavior conversion processing section 21, a pitch magnification calculation section 22, a volume magnification calculation section 23, and a table for changing pitch and volume, based on a vehicle signal. In Embodiment 1, as the vehicle information signal 1, an accelerator opening degree signal 11 and a vehicle speed signal 12 are utilized; however, other signals may be utilized.

Figure 4:
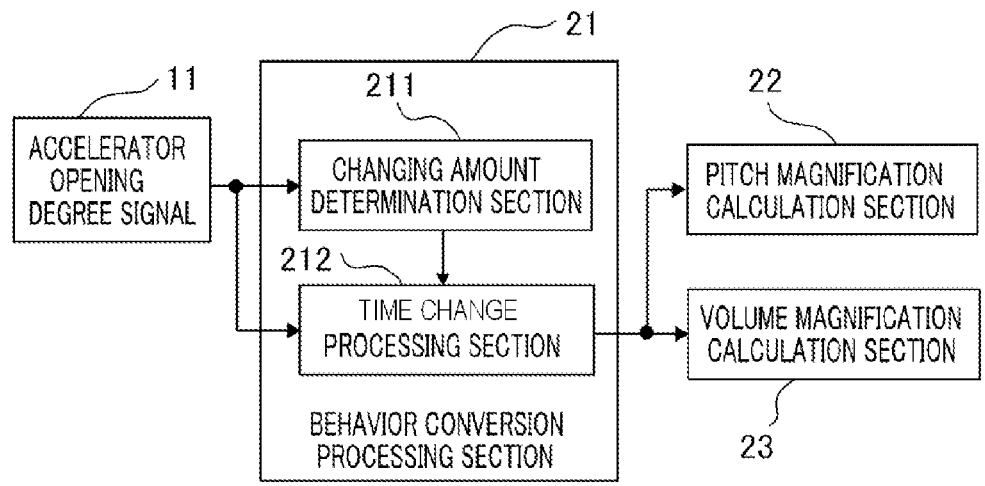
FIG. 4 is a block diagram representing the internal configuration of a behavior conversion processing section in a notification sound control unit of an approaching vehicle audible system according to Embodiment 1 of the present invention.

FIG. 4 is a block diagram representing the internal configuration of the behavior conversion processing section 21 according to Embodiment 1. The behavior conversion processing section 21 is provided with a changing amount determination section 211 and a time change processing section 212. The changing amount determination section 211 determines the status of a change in the accelerator opening degree, based on a time change in the accelerator opening degree signal 11. In accordance with the status of a change in the accelerator opening degree, which is determined by the changing amount determination section 211, the time change processing section 212 applies different time change processing to the accelerator opening degree signal and then outputs the processed accelerator opening degree signal to the pitch magnification calculation section 22 and the volume magnification calculation section 23. In comparison with the method in which a notification sound signal is generated by utilizing an inputted original accelerator opening degree signal and changing a pitch and a volume of a sound element, the foregoing system can realize a more natural and closer-to-a-real-vehicle notification sound based on a change in the accelerator opening degree, by performing the above-mentioned processing.

Figure 5:
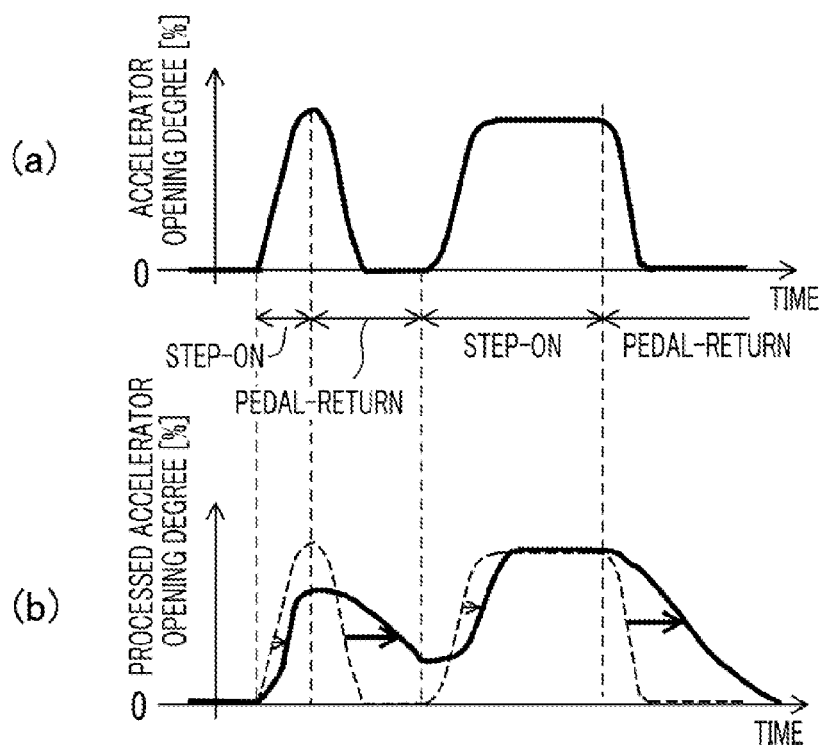
FIG. 5 is a set of curves symbolically representing an example of processing by a behavior conversion processing section in the notification sound control unit of the approaching vehicle audible system according to Embodiment 1 of the present invention.

FIG. 5 is a set of charts symbolically representing an example of processing by the behavior conversion processing section 21. In FIG. 5, the horizontal axis denotes the time, and the longitudinal axis denotes the accelerator opening degree. The solid-line curve in FIG. 5(*a*) at the upper side of FIG. 5 represents an example of accelerator opening degree signal to be inputted to the behavior conversion processing section 21; the solid-line curve in FIG. 5(*b*) at the lower side of FIG. 5 represents the processed accelerator opening degree signal obtained through processing by the behavior conversion processing section 21. In FIG. 5(*b*), the inputted accelerator opening degree signal is also represented by a broken line. In the processing represented in FIG. 5, the time change processing differs in accordance with an increase or a decrease in the accelerator opening degree signal. In Embodiment 1, in a step-on mode in which the accelerator opening degree signal increases, short-delay-time processing, i.e., short-delay processing is executed, as indicates by thin arrows; in a pedal-return mode in which the accelerator opening degree signal decreases, long-delay-time processing, i.e., long-delay processing is executed, as indicates by thick arrows. In a conventional engine automobile, in a step-on mode, i.e., in an acceleration mode, the engine rotation speed increases relatively faithfully following the accelerator opening degree; in a pedal-return mode, i.e., in a deceleration mode, the decrease in the engine rotation speed is delayed due to inertia, even when the acceleration pedal is returned. In FIG. 5, the relationship between the change in the accelerator opening degree and the change in the engine rotation speed of such a conventional automobile is simulated; the notification sound is changed based on the processed accelerator opening degree signal, so that a pedestrian or the like in the vicinity of the vehicle can be notified of the existence of the reference vehicle with a more natural sound sense.

Figure 6:
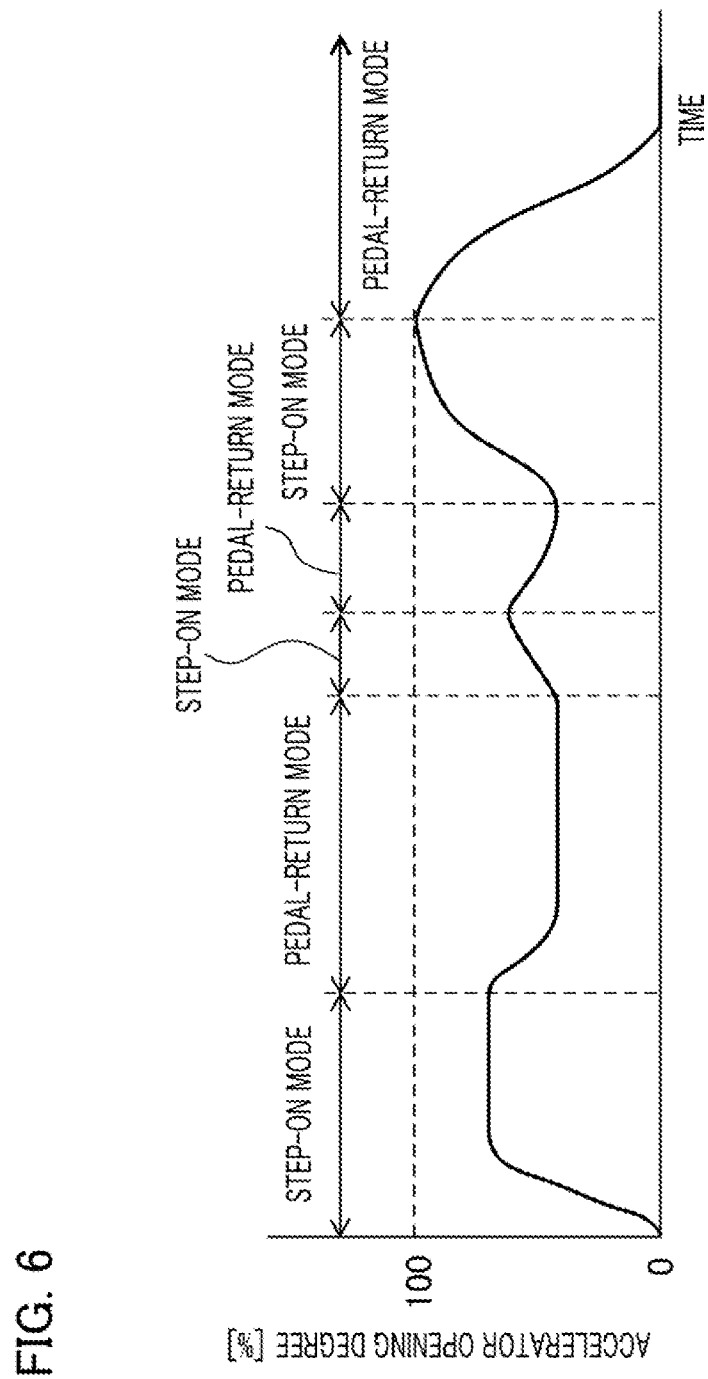
FIG. 6 is a curve representing an example of determination by a changing amount determination section in the notification sound control unit of the approaching vehicle audible system according to Embodiment 1 of the present invention.

Next, FIG. 6 represents an example of determination by the changing amount determination section 211 according to Embodiment 1. The longitudinal axis denotes the inputted accelerator opening degree signal, and the horizontal axis denotes the time. FIG. 6 represents how the changing amount determination section 211 categorizes the change into a plurality of modes in accordance with the change of the accelerator opening degree signal 11. In Embodiment 1, the changing amount determination section 211 divides the change into a "step-on mode" and a "pedal-return mode". When the accelerator opening degree signal 11 increases, the changing amount determination section 211 determines that the status of a change in the accelerator opening degree signal is the "step-on mode". Similarly, when the accelerator opening degree signal 11 decreases, the changing amount determination section 211 determines that the status of a change in the accelerator opening degree signal is the "pedal-return mode". The changing amount determination section 211 may determine the status of a change each time the accelerator opening degree signal 11 is obtained or every arbitrary cycle. Moreover, the changing amount determination section 211 may determine the status of a change, based on the change per sample or based on the change of an average value.

Figure 7:
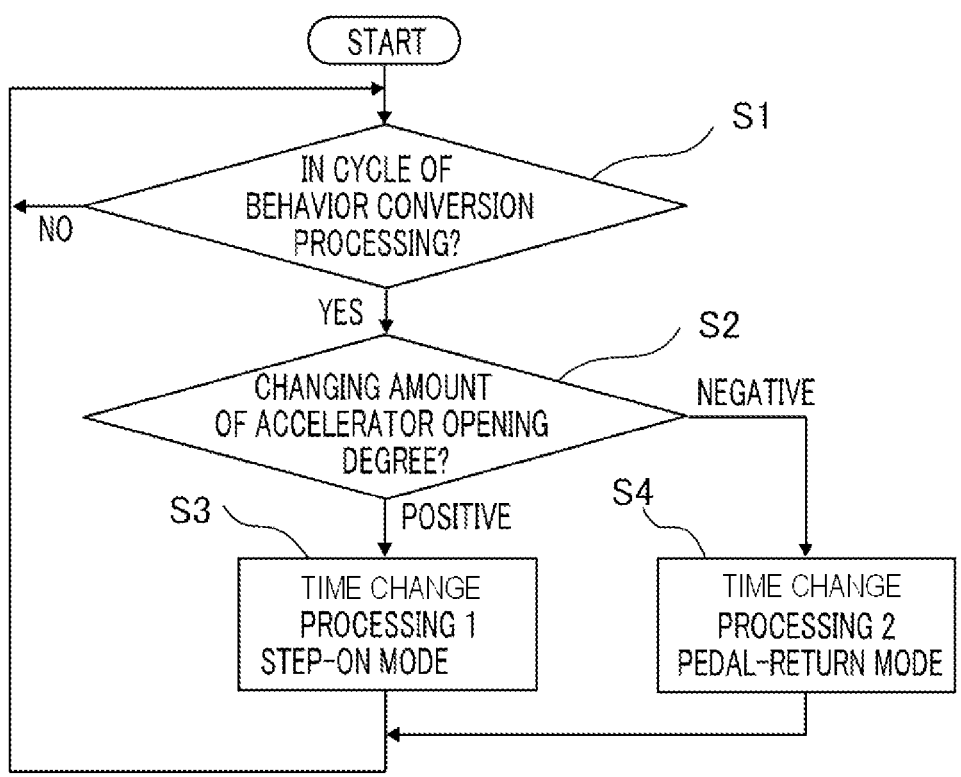
FIG. 7 is a flowchart representing the operation of a behavior conversion processing section in the notification sound control unit of the approaching vehicle audible system according to Embodiment 1 of the present invention.

FIG. 7 represents the operational flow of the behavior conversion processing section 21 according to Embodiment 1. In Embodiment 1, when the timing is in a cycle where the behavior conversion processing is to be executed (S1: YES) and then the changing amount determination section 211 determines that the changing amount of the accelerator opening degree is positive ("step-on mode") (S2: positive), the time change processing section 212 executes time change processing 1 (S3). In contrast, when the changing amount determination section 211 determines that the changing amount of the accelerator opening degree is negative ("pedal-return mode") (S2: negative), the time change processing section 212 executes time change processing 2 (S4). In this situation, the time change processing 1 may be either the same as or different from the time change processing 2. Moreover, it may be allowed that only parameters are changed. Because when the accelerator opening degree signal increases (in a step-on mode), the vehicle is accelerated, a safer time change processing is required; therefore, it is desirable to shorten the time until the change starts, i.e., to shorten the delay time. In contrast, because when the accelerator opening degree signal decreases, the vehicle is decelerated, the time until the change starts, i.e., the delay time may be prolonged so that high importance is placed on the naturalness of the notification sound. The cycle in which the behavior conversion processing is repeatedly executed (S1) may be either a cycle in which the accelerator opening degree signal 11 is recurrently obtained or an arbitrary cycle. Moreover, as far as the determination of the changing amount of the accelerator opening degree (S2) is concerned, the changing amount determination section 211 may determine the status of a change, based on the change per sample or based on the change of an average value.

As described above, the time change processing section 212 performs processing in which the rising timing or falling timing of the accelerator opening degree signal is delayed and processing in which the gradient of the accelerator opening degree signal is changed, i.e., time change processing so as to change the accelerator opening degree signal as the time elapses. The time change processing may be realized by not a simple time delay but filtering processing. Use of the filtering processing makes it possible to add time change processing without delaying the start of a sound change. Changing the number of taps of the filter or the filter coefficient makes it possible to freely adjust the sound change at a time when the accelerator pedal is depressed or returned. In the case of the time change processing realized by use of a table value, when the accelerator opening degree signal is newly updated, discontinuity between the past table value and the new table value occurs; however, through simple algorithm, the filtering processing deals with a constantly changing accelerator opening degree input signal, so that the sound change can be smoothed.

Figure 8:
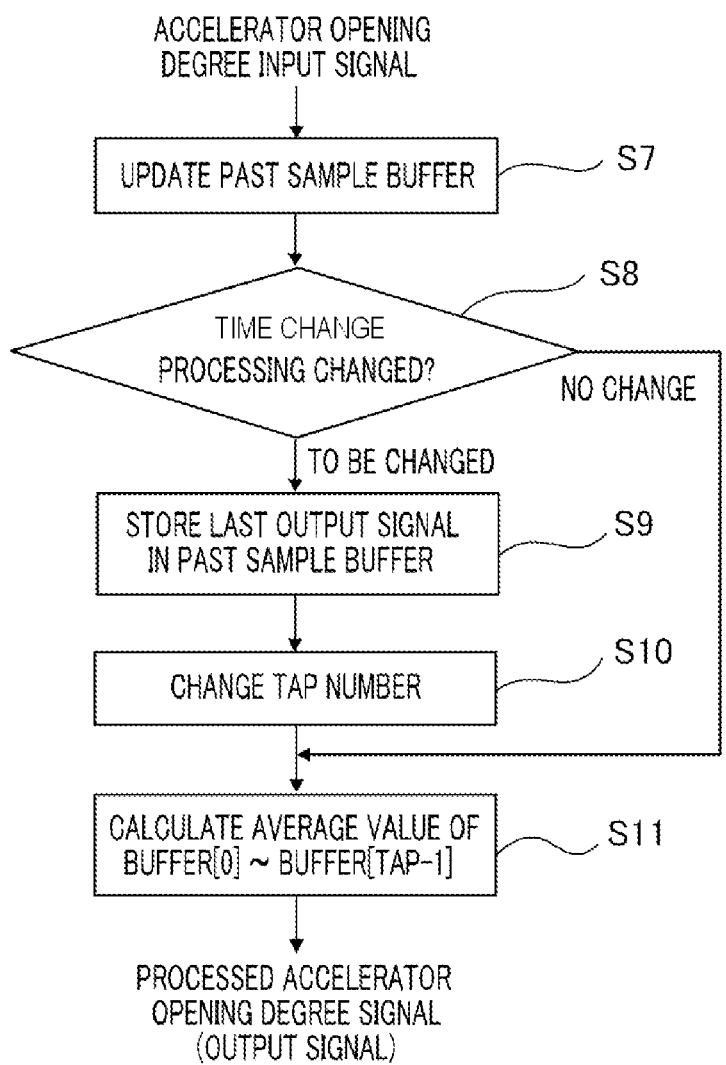
FIG. 8 is a flowchart representing an example of operation of a time change processing section in the notification sound control unit of the approaching vehicle audible system according to Embodiment 1 of the present invention.

As the filtering processing, simple moving average processing may be utilized. FIG. 8 represents an example of operational flow at a time when the time change processing is realized by simple moving average. In the time change processing utilizing simple moving average, a past sample of the acceleration opening degree input signal, which is required for calculation, is retained in a buffer. The buffer for a past sample is updated each time a new accelerator opening degree signal is inputted (S7). By use of the buffer, the average value of an arbitrary number of (an arbitrary tap number of) past samples is calculated (S11) and then is outputted as a processed accelerator opening degree signal (output signal). In the case where the mode of the status of a change in the accelerator opening degree signal changes and hence the time change processing is to be changed (S8: to be changed), the number of samples (the number of taps) to be averaged may be changed (S10). Changing the number of taps makes it possible to freely change the status of a change in the time change processing. In this regard, however, when only the number of taps is changed, discontinuity occurs in the sound when the modes are switched; therefore, it is desirable to initialize the buffer by storing the respective immediately previous processed accelerator opening degree signals in all of the elements of the buffer (S9).

Figure 9:
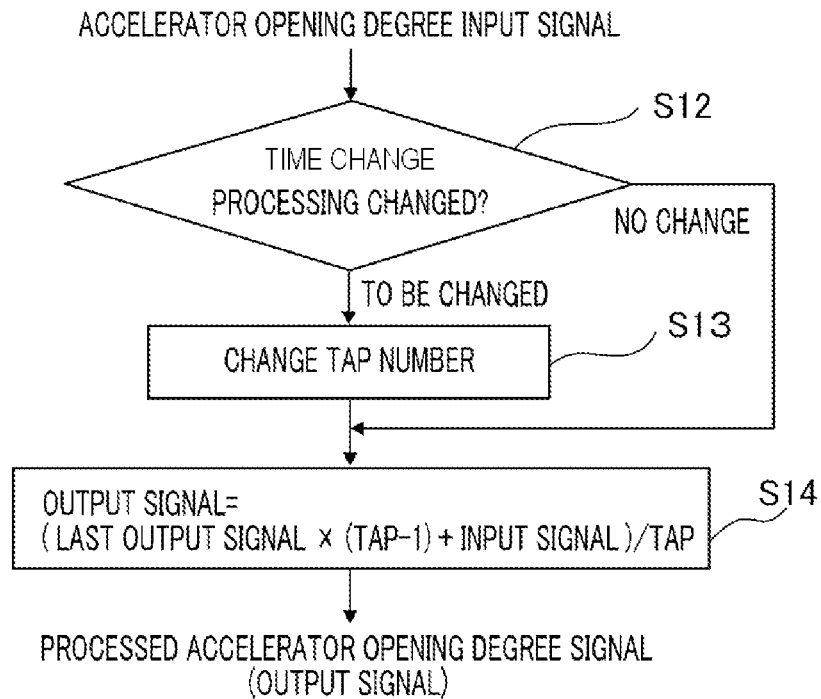
FIG. 9 is a flowchart representing another example of operation of the time change processing section in the notification sound control unit of the approaching vehicle audible system according to Embodiment 1 of the present invention.

For the filtering processing, an index moving average may be utilized. FIG. 9 represents an example of operational flow at a time when the time change processing is realized by an index moving average. In the time change processing through an index moving average processing, the present processed accelerator opening degree signal (output signal) is calculated from the immediately previous processed accelerator opening degree signal and the accelerator opening degree input signal (S14). In the case where the mode of the status of a change in the accelerator opening degree signal changes and hence the time change processing is to be changed (S12: to be changed), the ratio (tap) of the processed accelerator opening degree signal to which the calculation equation (S14) has not been applied to the accelerator opening degree input signal may be changed (S13). Unlike a simple moving average, in the case of an index moving average, the value of the immediately previous processed accelerator opening degree signal is utilized as the past sample; therefore, the buffer for retaining past samples is not required. Accordingly, when an index moving average processing is utilized in the time change processing, the memory capacity can be reduced. Use of the simple moving average processing or the index moving average processing makes it possible to realize a natural and high-quality-feeling notification sound, with simpler algorithm than that of an ordinary FIT (Finite Impulse Response) filter or an IIR (Infinite Impulse Response) filter and with a smaller processing load and a smaller capacity of the used memory.

Figure 10:
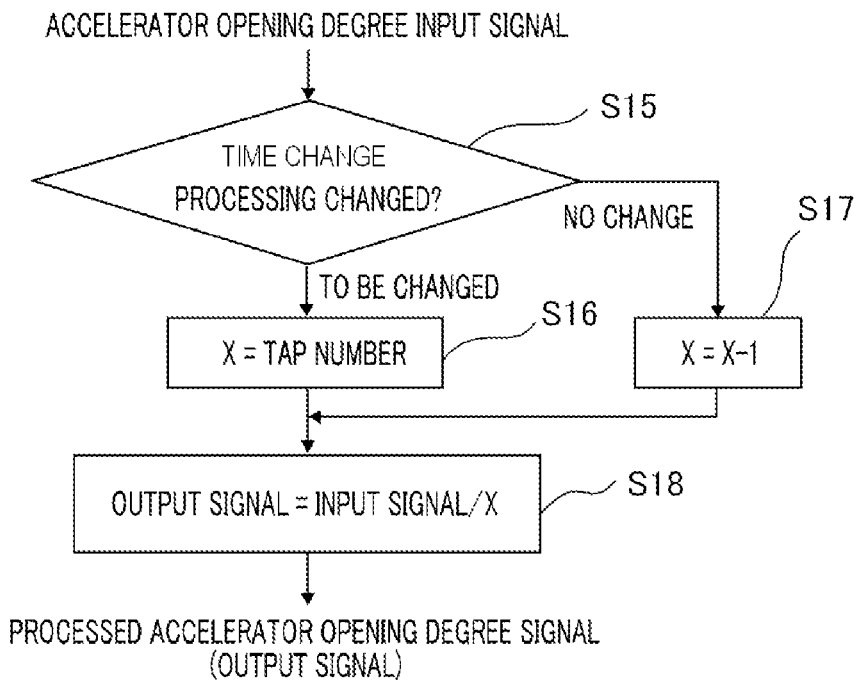
FIG. 10 is a flowchart representing further another example of operation of the time change processing section in the notification sound control unit of the approaching vehicle audible system according to Embodiment 1 of the present invention.

In the time change processing section 212, the time change processing may be realized by a calculation equation including any one of multiplication, division, addition, and subtraction or a calculation equation integrally including two or more of them. FIG. 10 represents an example of operational flow at a time when the time change processing is realized by a division. In the time change processing through a division, the processed accelerator opening degree signal (output signal) is calculated by dividing the accelerator opening degree input signal by a specific value X (S18). In the case where the mode of the status of a change in the accelerator opening degree signal changes and hence the time change processing is to be changed (S15: to be changed), an arbitrary value TAP is substituted for the value X (S16); in the case where the time change processing is not changed (S15: no change), X is decremented for each sample (S17). The time change processing through division can be utilized as a method of gradually increasing the value, especially in the step-on mode. Because the time change processing is executed by not a simple time delay but a calculation equation, it is made possible to freely change the lingering of a sound change without delaying the starting timing of the sound change. The time change processing may also be executed through differentiation or integration. Use of differentiation for the time change processing makes it possible to add lingering of a sound change corresponding to the changing amount. Use of integration makes it possible to add smooth lingering of a sound change.

The pitch magnification calculation section 22 compares the value of the vehicle information signal inputted thereto with a vehicle information vs. pitch table so as to output a pitch magnification corresponding to each vehicle information. For example, in the case where the vehicle information signal is the accelerator opening degree signal, the pitch magnification calculation section 22 compares the value of the processed accelerator opening degree signal obtained from the behavior conversion processing section 21 with an accelerator opening degree vs. pitch table 24 so as to output a pitch magnification corresponding to the accelerator opening degree. Similarly, in the case where the vehicle information signal is the vehicle speed signal, the pitch magnification calculation section 12 compares the vehicle speed signal 12 with a vehicle speed vs. pitch table 25 so as to output a pitch magnification corresponding to the vehicle speed.

The volume magnification calculation section 23 compares the value of the vehicle information signal inputted thereto with a vehicle information vs. volume table so as to output a volume magnification corresponding to each vehicle information. For example, in the case where the vehicle information signal is the accelerator opening degree signal, the volume magnification calculation section 23 compares the value of the processed accelerator opening degree signal obtained from the behavior conversion processing section 21 with an accelerator opening degree vs. volume table 26 so as to output a volume magnification corresponding to the value of the processed accelerator opening degree signal. Similarly, in the case where the vehicle information signal is the vehicle speed signal, the volume magnification calculation section 23 compares the vehicle speed signal 12 with a vehicle speed vs. volume table 27 so as to output a volume magnification corresponding to the vehicle speed.

Figure 11:
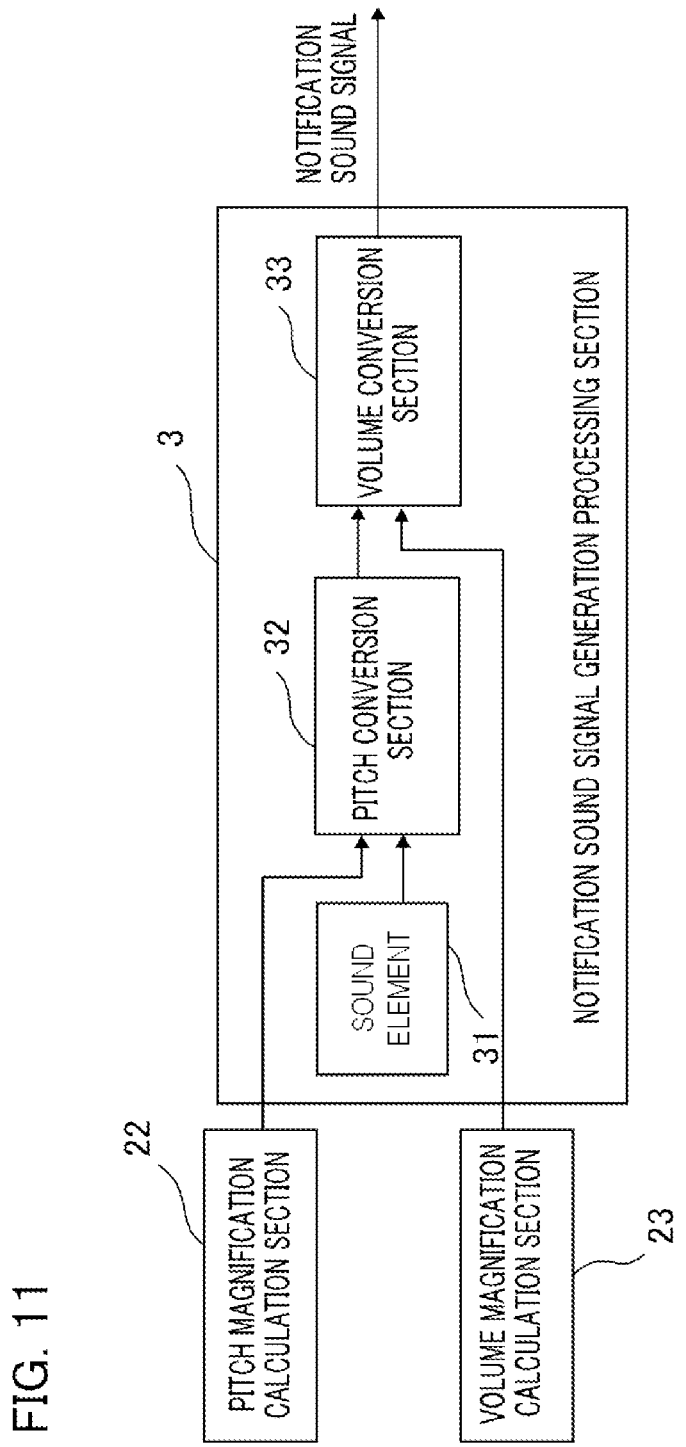
FIG. 11 is a block diagram representing the internal configuration of a notification sound signal generation processing section in the notification sound control unit of the approaching vehicle audible system according to Embodiment 1 of the present invention.

Based on the pitch magnification and the volume magnification obtained from the sound magnification conversion processing unit 2, the notification sound signal generation processing section 3 adjusts a pitch and a volume of a sound element so as to synthesize a sound and output the sound to a speaker through an amplifier. FIG. 11 is a block diagram representing the internal configuration of the notification sound signal generation processing section 3 according to Embodiment 1. The notification sound signal generation processing section 3 is configured with a sound element 31, a pitch conversion section 32, and a volume conversion section 33.

The sound element 31 is a loop sound obtained by storing for a predetermined time digital data of a sound created, for example, through PCM, as data of a sound that is a base of the notification sound. The predetermined time is a short time, for example, one second in which the sound element can be recognized as a sound. Based on the pitch magnification calculated by the pitch magnification calculation section 22, the pitch conversion section 32 modifies the sound signal of the sound element 31 and outputs the modified sound signal. For example, in the case where the pitch magnification is 2.0, in order to double the pitch, i.e., the frequency of the sound, the sound element in which data pieces of the sound element are thinned out by half are created, i.e. when the original sound element is one-second data, 0.5-second data are created and then are outputted as a sound element that repeat the 0.5-second data. Based on the volume magnification calculated by the volume magnification calculation section 23, the volume conversion section 33 modifies the volume of the sound element outputted from the pitch conversion section 32, i.e., the amplitude thereof. The sound element is not limited to the one that make a conventional engine sound imagined and may be an arbitrary sound such as a sinusoidal sound, a white-noise sound, or a melody sound. It is desirable that the sound element 31 is data stored in a ROM or a RAM, which is an internal memory or an external memory; however, it may be allowed that the sound element 31 is data that are inputted in real time.

The pitch conversion section 32 makes an adjustment on at which rate the pitch magnification corresponding to a plurality of vehicle information items is reflected. The volume conversion section 33 makes an adjustment on at which rate the volume magnification corresponding to a plurality of vehicle information items is reflected.

As described above, Embodiment 1 makes it possible that in accordance with the status of switching between the step-on mode and the pedal-return mode, the time change processing is varied in such a way as to quickly respond if required or to slowly respond if not required. As a result, a safe, more natural, and high-quality-feeling sound is reproduced. Moreover, a sound in the accelerator-step-on mode or the pedal-return mode can freely be changed depending on a driver's preference.

Embodiment 2

Figure 12:
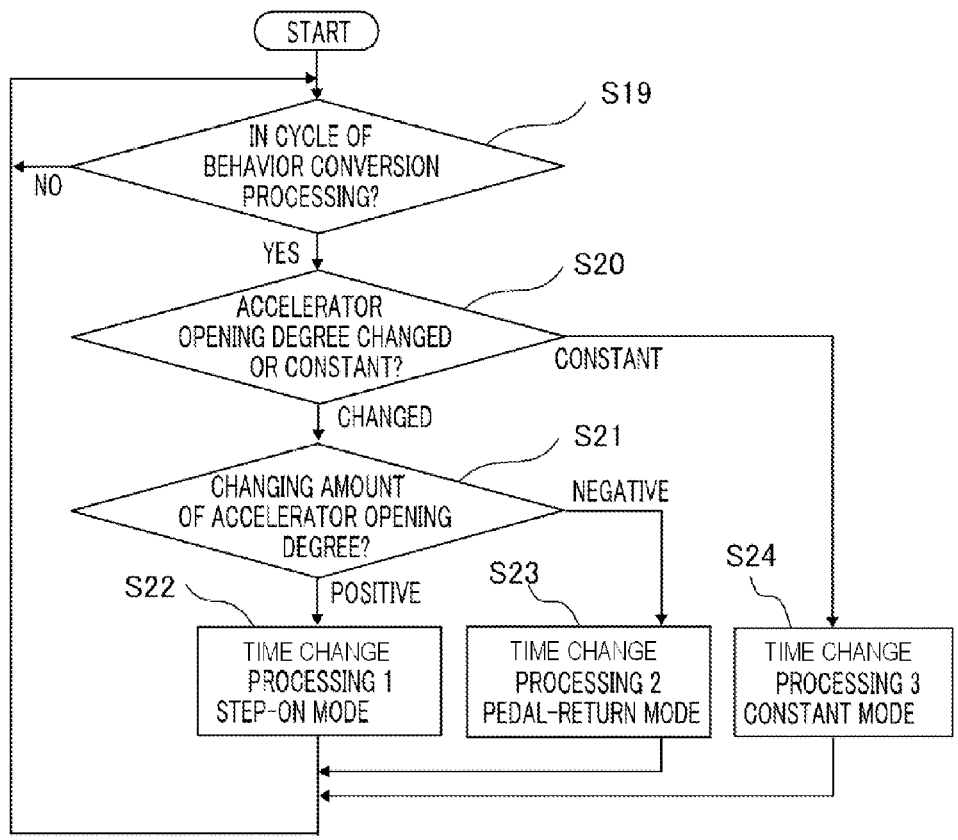
FIG. 12 is a flowchart representing the operation of a behavior conversion processing section in a notification sound control unit of an approaching vehicle audible system according to Embodiment 2 of the present invention.

FIG. 12 is a flowchart representing the operation of a behavior conversion processing section 21 in a notification sound control unit of an approaching vehicle audible system according to Embodiment 2 of the present invention. In Embodiment 2, the changing amount determination section 211 determines whether the accelerator opening degree is constant or has changed (S20). When the changing amount determination section 211 determines that the accelerator opening degree is constant (S20: constant), the time change processing section 212 executes time change processing 3 (S24: processing in a constant mode). When determining that the accelerator opening degree has changed (S20: changed), the time change processing section 211 checks the changing amount of the accelerator opening degree (S21). When the changing amount determination section 211 determines that the changing amount of the accelerator opening degree is positive (step-on) (S21: positive), the time change processing section 212 executes time change processing 1 (S22: processing in the step-on mode). In contrast, when the changing amount determination section 211 determines that the changing amount of the accelerator opening degree is negative (pedal-return) (S21: negative), the time change processing section 212 executes time change processing 2 (S23: processing in the pedal-return mode). The cycle (S19) in which the behavior conversion processing is executed may be either a cycle in which the accelerator opening degree signal 11 is recurrently obtained or an arbitrary cycle. Moreover, as far as the determination (S20) on whether or not the accelerator opening degree is constant or the determination (S21) on the changing amount of the accelerator opening degree is concerned, the changing amount determination section 211 may determine the status of a change, based on the change per sample or based on the change of an average value.

The time change processing 1 (S22), the time change processing 2 (S23), and the time change processing 3 (S24) may be either the same as or different from one another. Moreover, it may be allowed that only parameters are changed. Because when the accelerator opening degree signal increases (in a step-on mode), the vehicle is accelerated, a safer time change processing is required; therefore, it is desirable to shorten the time until the change starts. In contrast, because when the accelerator opening degree signal decreases, the vehicle is decelerated, it may be allowed that the time until the change starts is prolonged so that high importance is placed on the naturalness of the notification sound. Unlike the case where the accelerator opening degree signal changes, when the acceleration opening degree signal is constant, a generated sound scarcely provides the feeling of discomfort even when the unprocessed acceleration opening degree signal is reflected in the sound. Accordingly, as far as the time change processing 3 (S24) that is executed when the accelerator opening degree signal is constant is concerned, time change processing may not be executed or the time until the change starts may further be shortened in comparison with the step-on mode.

Figure 13:
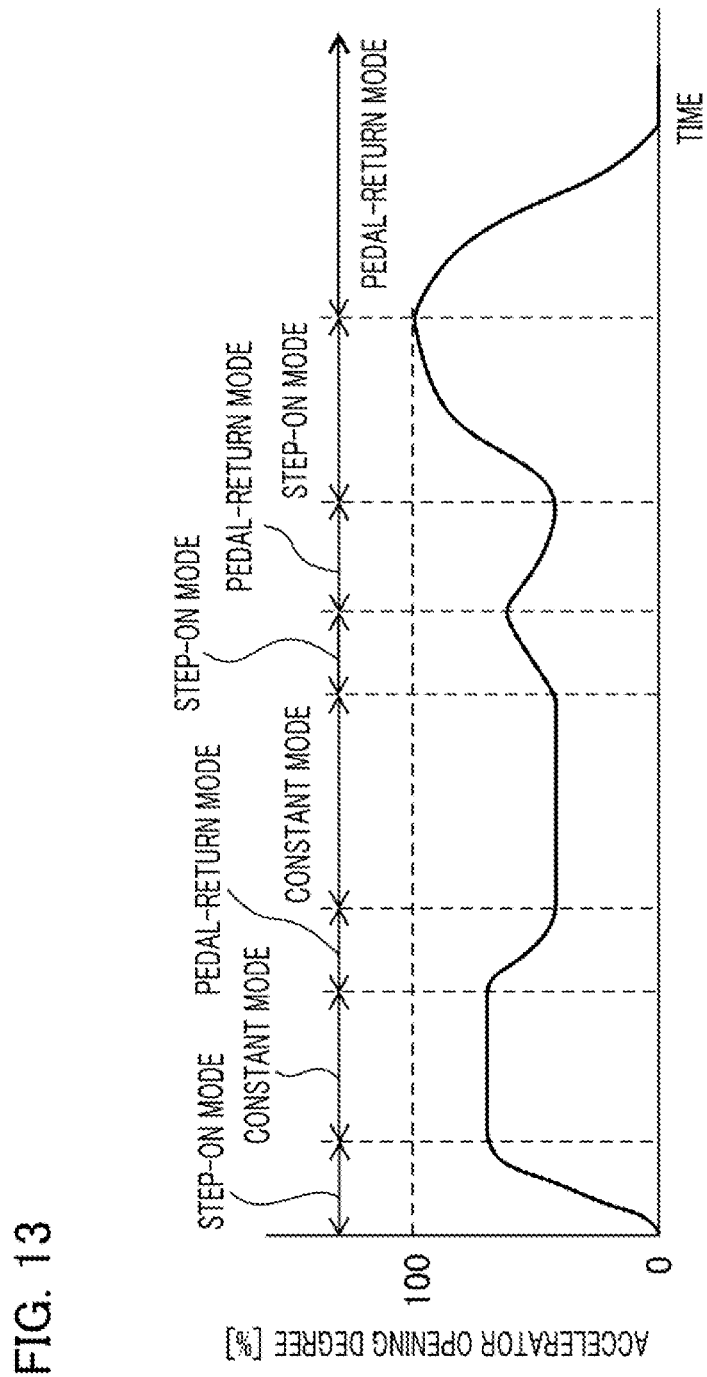
FIG. 13 is a curve representing an example of determination by a changing amount determination section in the notification sound control unit of the approaching vehicle audible system according to Embodiment 2 of the present invention.

FIG. 13 represents an example of determination by the changing amount determination section 211 according to Embodiment 2. The longitudinal axis denotes the inputted accelerator opening degree signal, and the horizontal axis denotes the time. FIG. 13 represents how, in accordance with a change in the accelerator opening degree signal 11, the changing amount determination section 211 determines the status of the change and categorizes it into a plurality of modes. In Embodiment 2, the changing amount determination section 211 divides the status of a change into a "step-on mode", a "pedal-return mode", and a "constant mode", and determines in which mode the status of a change in the inputted accelerator opening degree signal is. When the accelerator opening degree signal 11 increases, the changing amount determination section 211 determines that the status of a change in the accelerator opening degree signal is the "step-on mode". Similarly, when the accelerator opening degree signal 11 decreases, the changing amount determination section 211 determines that the status of a change in the accelerator opening degree signal is the "pedal-return mode". When the accelerator opening degree signal 11 does not change, the changing amount determination section 211 determines that the status of a change in the accelerator opening degree signal is the "constant mode". The changing amount determination section 211 may determine the status of a change each time the accelerator opening degree signal 11 is obtained or every predetermined cycle. Moreover, the changing amount determination section 211 may determine the status of a change, based on the changing amount per sample or based on the changing amount of an average value.

Unlike the case where the accelerator opening degree signal changes, when the acceleration opening degree signal is constant, a generated sound scarcely provides the feeling of discomfort even when the unprocessed acceleration opening degree signal is reflected in the sound. In Embodiment 2, when the accelerator opening degree signal is constant, the time change processing is not executed or the time until the change starts is shortened in comparison with the case where the accelerator opening degree signal changes; thus, a safe, more natural, and high-quality-feeling sound can be realized with a less processing load.

Embodiment 3

Figure 14:
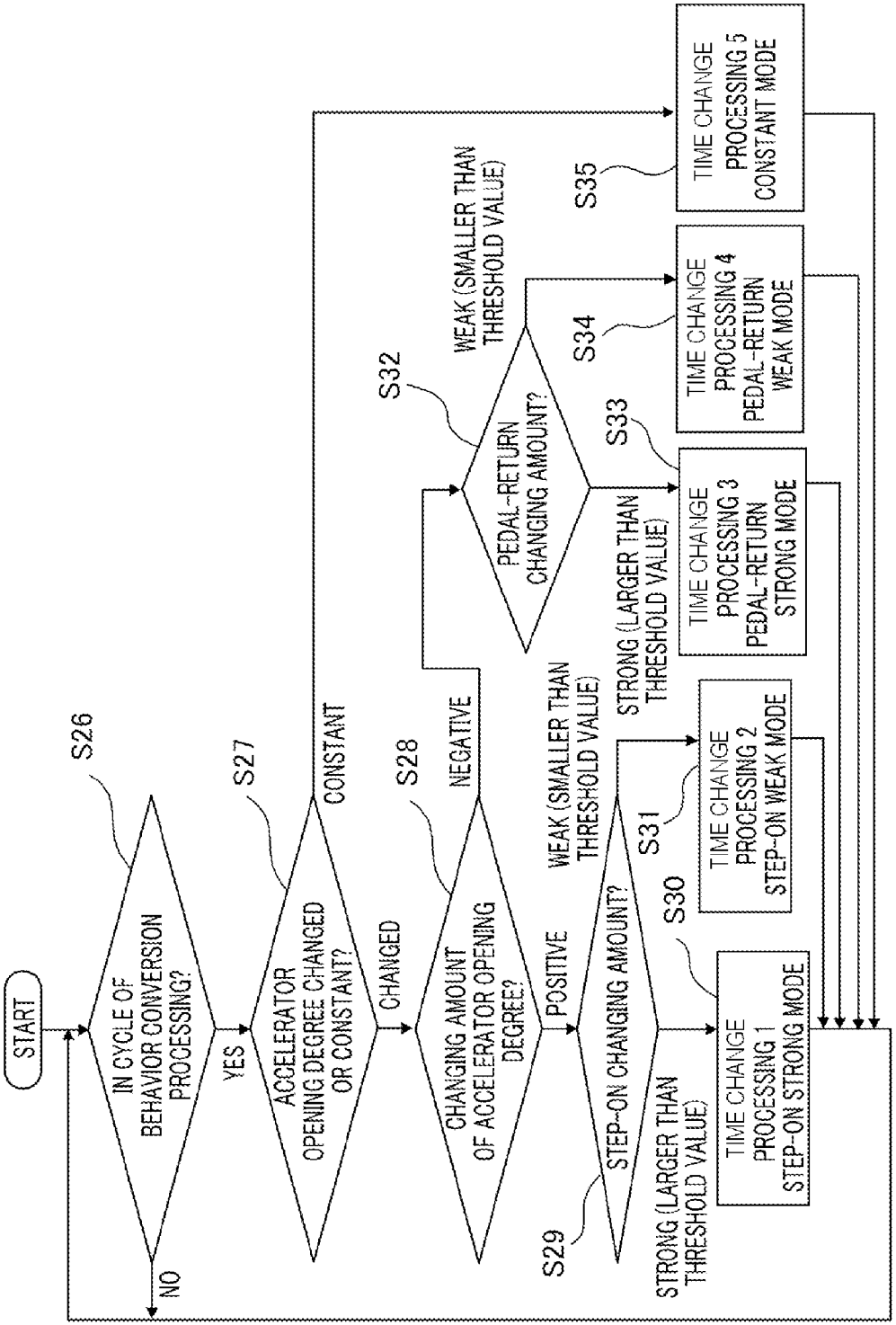
FIG. 14 is a flowchart representing the operation of a behavior conversion processing section in a notification sound control unit of an approaching vehicle audible system according to Embodiment 3 of the present invention.

FIG. 14 is a flowchart representing the operation of a behavior conversion processing section 21 in a notification sound control unit of an approaching vehicle audible system according to Embodiment 3 of the present invention. In Embodiment 3, a strong mode and a weak mode are added to the mode of the status of a change in the behavior conversion processing section 21 of Embodiment 2.

Figure 15:
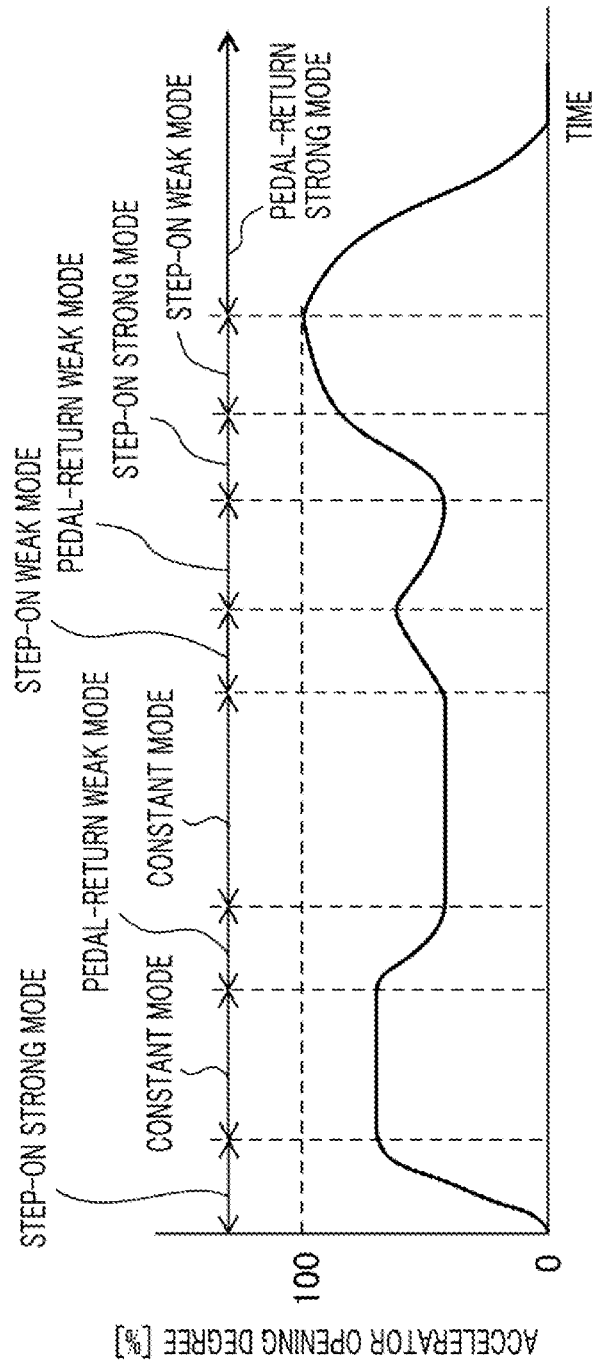
FIG. 15 is a curve representing an example of determination by a changing amount determination section in the notification sound control unit of the approaching vehicle audible system according to Embodiment 3 of the present invention.

FIG. 15 represents an example of determination by the changing amount determination section 211 according to Embodiment 3. The longitudinal axis denotes the inputted accelerator opening degree signal, and the horizontal axis denotes the time. FIG. 15 represents how, in accordance with a change in the accelerator opening degree signal 11, the changing amount determination section 211 determines the status of the change and categorizes it into a plurality of modes. In Embodiment 3, the changing amount determination section 211 divides the status of a change into a "step-on strong mode", a "step-on weak mode", a "pedal-return strong mode", a "pedal-return weak mode", and a "constant mode". When the accelerator opening degree signal 11 largely increases, the changing amount determination section 211 determines that the status of a change in the accelerator opening degree signal is the "step-on strong mode"; when the accelerator opening degree signal 11 slightly increases, the changing amount determination section 211 determines that the status of a change in the accelerator opening degree signal is the "step-on weak mode". When the accelerator opening degree signal 11 largely decreases, the changing amount determination section 211 determines that the status of a change in the accelerator opening degree signal is the "pedal-return strong mode"; when the accelerator opening degree signal 11 slightly decreases, the changing amount determination section 211 determines that the status of a change in the accelerator opening degree signal is the "pedal-return weak mode". When the accelerator opening degree signal 11 does not change, the changing amount determination section 211 determines that the status of a change in the accelerator opening degree signal is the "constant mode". The changing amount determination section 211 may determine the status of a change each time the accelerator opening degree signal 11 is obtained or every arbitrary cycle. Moreover, the changing amount determination section 211 may determine the status of a change, based on the changing amount per sample or based on the changing amount of an average value.

The operation of the behavior conversion processing section 21 according to Embodiment 3 will be explained following the operational flow in FIG. 14. At first, when the timing is in the cycle where the behavior conversion processing is executed (S26: YES), the changing amount determination section 211 determines whether the accelerator opening degree is constant or has changed (S27). When the changing amount determination section 211 determines that the accelerator opening degree is constant (S27: constant), the time change processing section 212 executes time change processing 5 (S35). When determining that the accelerator opening degree has changed (S27: changed), the time change processing section 211 checks the changing amount of the accelerator opening degree (S28). When the changing amount determination section 211 determines that the changing amount of the accelerator opening degree is positive (step-on) (S28: positive), the changing amount determination section 211 checks whether the step-on amount of the accelerator opening degree is larger or smaller than a predetermined threshold value (S29). When the changing amount determination section 211 determines that the step-on amount is larger than the threshold value (S29: strong), the time change processing section 212 executes the time change processing 1 (S30: processing in the step-on strong mode). When the changing amount determination section 211 determines that the step-on amount is smaller than the threshold value (S29: weak), the time change processing section 212 executes the time change processing 2 (S31: processing in the step-on weak mode).

In contrast, when the changing amount determination section 211 determines that the changing amount of the accelerator opening degree is negative ("pedal-return mode") (S28: negative), the changing amount determination section 211 checks whether the pedal-return amount of the accelerator opening degree is larger or smaller than a predetermined threshold value (S32). When the changing amount determination section 211 determines that the pedal-return amount is larger than the threshold value (S32: strong), the time change processing section 212 executes the time change processing 3 (S33: processing in the pedal-return strong mode). When the changing amount determination section 211 determines that the pedal-return amount is smaller than the threshold value (S32: weak), the time change processing section 212 executes the time change processing 4 (S34: processing in the pedal-return weak mode). In this situation, the time change processing 1 (S30), the time change processing 2 (S31), the time change processing 3 (S32), the time change processing 4 (S33), and the time change processing 5 (S34) may be either the same as or different from one another. Moreover, it may be allowed that only parameters are changed. The cycle in which the behavior conversion processing is repeatedly executed (S26) may be either a cycle in which the accelerator opening degree signal 11 is recurrently obtained or an arbitrary cycle. Moreover, as far as the determination on whether or not the accelerator opening degree is constant (S27), the determination on the changing amount of the accelerator opening degree (S28), the determination on the step-on changing amount (29), and the determination on the pedal-return changing amount are concerned (S32), the changing amount determination section 211 may determine the status of a change, based on the change per sample or based on the change of an average value.

For example, because when the accelerator opening degree signal increases (in the step-on mode), the vehicle is accelerated, a safer time change processing is required; therefore, it is desirable to shorten the time until the change starts. In contrast, because when the accelerator opening degree signal decreases, the vehicle is decelerated, it may be allowed that the time until the change starts is prolonged so that high importance is placed on the naturalness of the notification sound. Unlike the case where the accelerator opening degree signal changes, when the acceleration opening degree signal is constant, a generated sound scarcely provides the feeling of discomfort even when the unprocessed acceleration opening degree signal is reflected in the sound. Accordingly, as far as the time change processing 5 that is executed when the accelerator opening degree signal is constant (S35) is concerned, time change processing may not be executed or the time until the change starts may further be shortened in comparison with the case where the accelerator opening degree signal changes. Because when the changing amount of the accelerator opening degree signal is large, rapid acceleration or rapid deceleration is anticipated, the time until the change starts may further be shortened in order to raise the safety. On the contrary, because when the changing amount of the accelerator opening degree signal is large, the sound rapidly changes and hence the feeling of discomfort is liable to occur, the time until the change starts may be prolonged. This method makes it possible to execute time change processing that differs depending on the changing amount of the accelerator opening degree; therefor, the safety can further be raised. Because the time change processing that differs depending on the changing amount of the accelerator opening degree is executed, the change in the sound can flexibly be adjusted in accordance with the situation or the preference.

Embodiment 4

Figure 16:
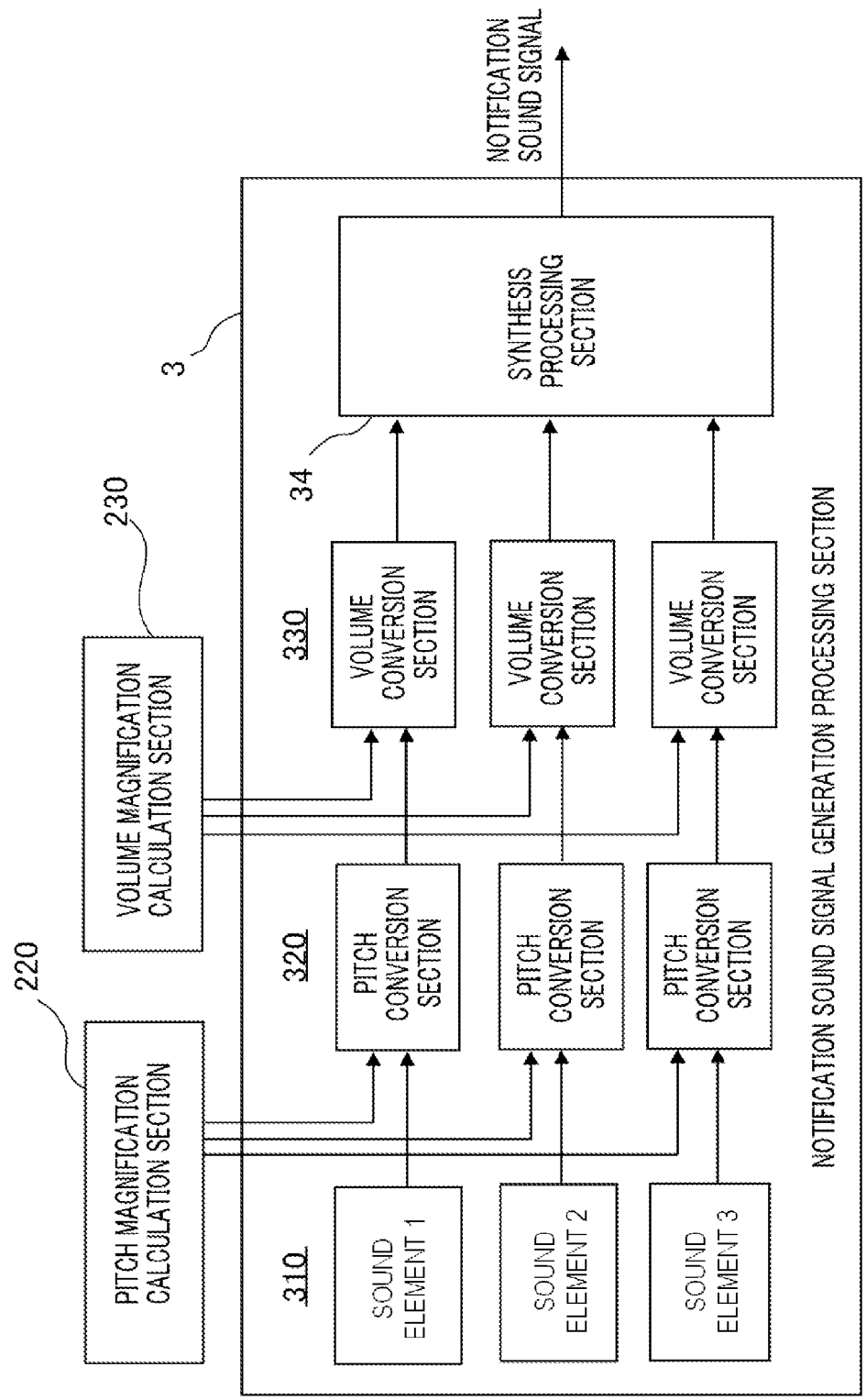
FIG. 16 is a block diagram representing the internal configuration of a notification sound signal generation processing section in a notification sound control unit of an approaching vehicle audible system according to Embodiment 4 of the present invention.
Figure 17:
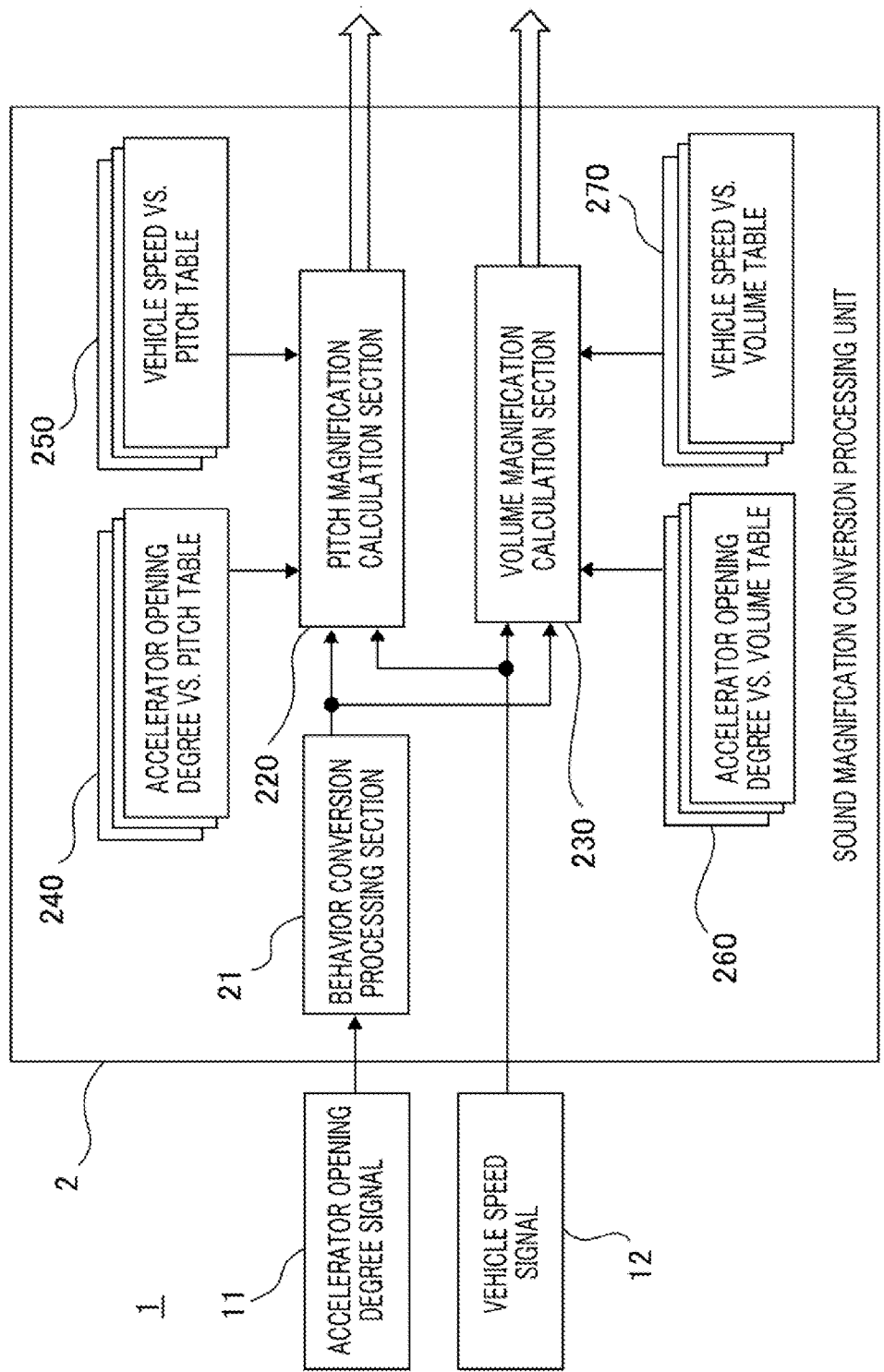
FIG. 17 is a block diagram representing the internal configuration of a sound magnification conversion processing unit in the notification sound control unit of the approaching vehicle audible system according to Embodiment 4 of the present invention.

FIG. 16 is a block diagram representing the internal configuration of a notification sound signal generation processing section in a notification sound control unit of an approaching vehicle audible system according to Embodiment 4 of the present invention. A notification sound signal generation processing section 3 according to Embodiment 4 has a plurality of sound elements 310, i.e., a sound element 1, a sound element 2, and a sound element 3. FIG. 17 is a block diagram representing the internal configuration of a sound magnification conversion processing unit 2 in the notification sound control unit of an approaching vehicle audible system according to Embodiment 4 of the present invention.

A pitch magnification calculation section 220 compares the value of the vehicle information signal inputted thereto with a vehicle information vs. pitch table for each sound element so as to output a pitch magnification for each sound element corresponding to each vehicle information. For example, in the case where the vehicle information signal is the accelerator opening degree signal, the pitch magnification calculation section 220 compares the value of the processed accelerator opening degree signal obtained from the behavior conversion processing section 21 with an accelerator opening degree vs. pitch table 240 for each sound element so as to output a pitch magnification for each sound element corresponding to the accelerator opening degree. Similarly, in the case where the vehicle information signal is the vehicle speed signal, the pitch magnification calculation section 220 compares the vehicle speed signal 12 with a vehicle speed vs. pitch table 250 for each sound element so as to output a pitch magnification for each sound element corresponding to the vehicle speed. The behavior conversion processing section 21 applies behavior conversion processing, similar to the behavior conversion processing explained in any one of Embodiments 1 through 3, to the accelerator opening degree signal 11.

A volume magnification calculation section 230 compares the value of the vehicle information signal inputted thereto with a vehicle information vs. volume table for each sound element so as to output a volume magnification for each sound element corresponding to each vehicle information. For example, in the case where the vehicle information signal is the accelerator opening degree signal, the volume magnification calculation section 230 compares the value of the processed accelerator opening degree signal obtained from the behavior conversion processing section 21 with an accelerator opening degree vs. volume table 260 for each sound element so as to output a volume magnification for each sound element corresponding to the value of the processed accelerator opening degree signal. Similarly, in the case where the vehicle information signal is the vehicle speed signal, the volume magnification calculation section 230 compares the vehicle speed signal 12 with a vehicle speed vs. volume table 27 for each sound element so as to output a volume magnification for each sound element corresponding to the vehicle speed.

A pitch conversion section 320 in the notification sound signal generation processing section 3 changes the pitch for each of the sound elements 1, 2, and 3 of the sound elements 310, by use of a pitch magnification for each sound element outputted from the pitch magnification calculation section 220. A volume conversion section 330 changes the volume of a sound signal outputted for each sound element from the pitch conversion section 320, by use of the volume magnification for each sound element outputted from the volume magnification calculation section 230. A synthesis processing section 34 synthesizes a plurality of sound element data pieces whose pitches and volumes have been changed, makes an adjustment for a final volume, and then outputs a notification sound signal.

As described above, in Embodiment 4, a plurality of sound elements are provided, and the pitch magnification and the volume magnification are change for each sound element; therefore, while in the case of a single sound element, the pitch is raised more than necessary and hence the notification sound is biased to the high-frequency band, the bias is eliminated because the pitch and the volume are controlled independently for each sound element. For example, while the pitch of one sound element is raised as the accelerator opening degree signal becomes larger, the pitch of another sound element is raised less or is held constantly, so that it is made possible to output a notification sound having a frequency band ranging up to a low frequency band, regardless of the acceleration opening degree.

Embodiment 5

Figure 18:
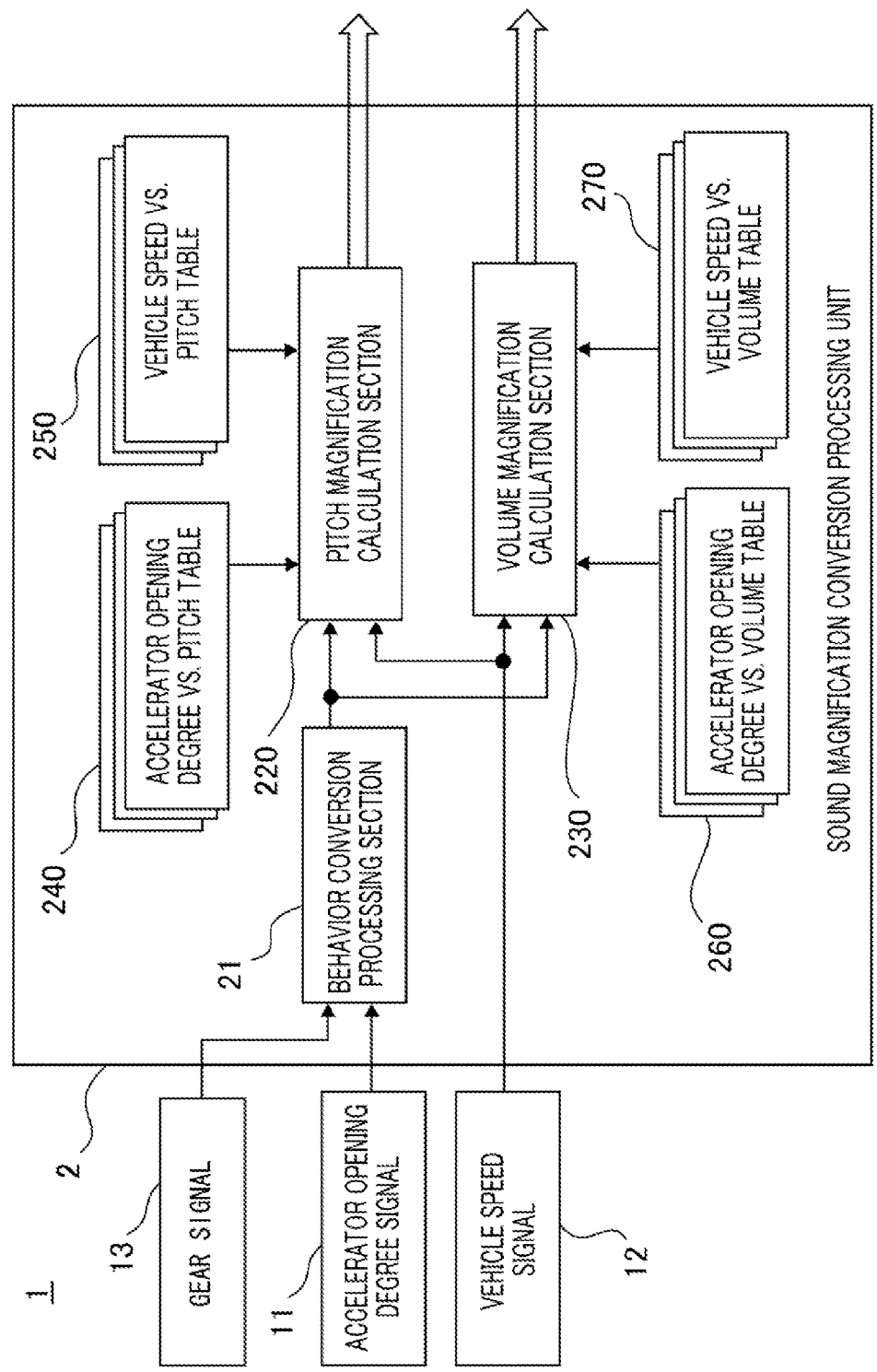
FIG. 18 is a block diagram representing the internal configuration of a sound magnification conversion processing unit in a notification sound control unit of an approaching vehicle audible system according to Embodiment 5 of the present invention.
Figure 19:
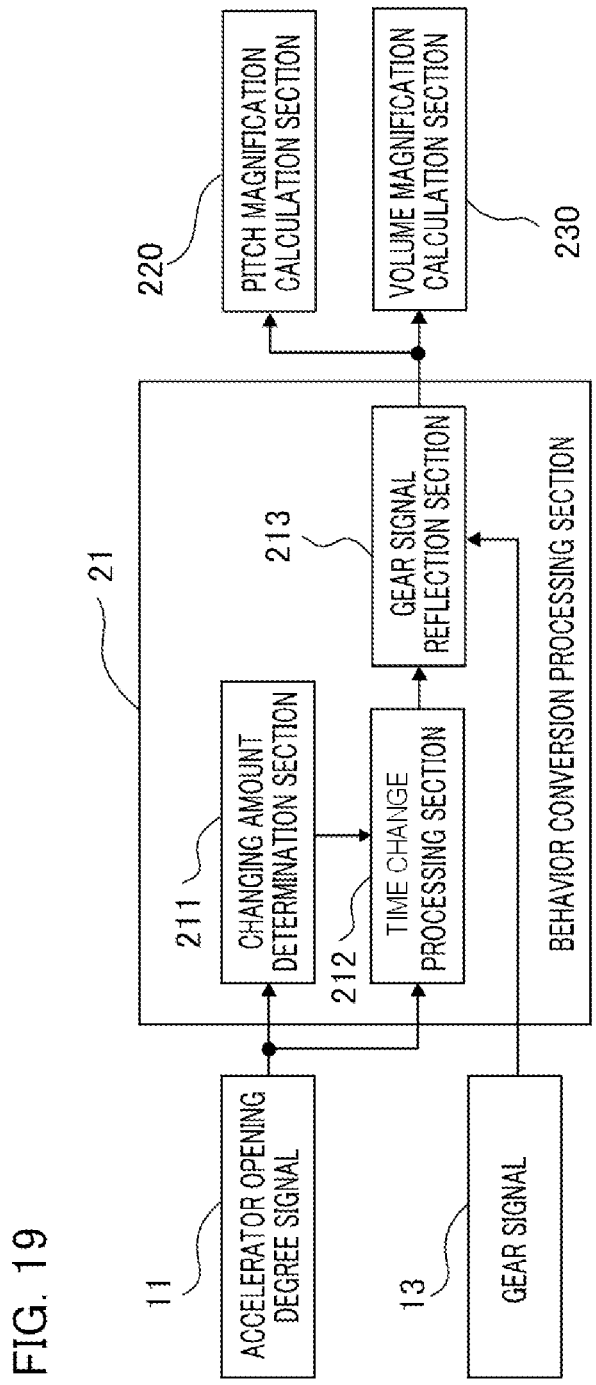
FIG. 19 is a block diagram representing the internal configuration of a behavior conversion processing section in the notification sound control unit of the approaching vehicle audible system according to Embodiment 5 of the present invention.

FIG. 18 is a block diagram representing an example of internal configuration of a sound magnification conversion processing unit 2 in a notification sound control unit of an approaching vehicle audible system according to Embodiment 5 of the present invention. FIG. 18 represents the internal configuration of the sound magnification conversion processing unit 2 at a time when a gear signal 13 is added to the vehicle information 1. FIG. 19 represents the internal configuration of a behavior conversion processing section 21 according to Embodiment 5. A gear signal reflection section 213 normalizes a signal outputted from the time change processing section 212 with a rate that differs depending on the status of the gear signal 13. For example, in the case where the gear signal 13 is in a D (drive) range, the normalization may be executed in such a way that the maximum value of the processed accelerator opening degree signal becomes 50%, and in the case where the gear signal 13 is in an N (neutral) range, the normalization may be executed in such a way that the maximum value of the processed accelerator opening degree signal becomes 100%. As a result, the difference among the sounds at a time when the gear signal is changed can be realized.

FIG. 20 represents the operational flow of behavior conversion processing according to Embodiment 5. This is an operational flow in which gear signal reflection processing (S6) is added to the operational flow represented in FIG. 7 of Embodiment 1. For example, as the gear reflection processing (S6), the processed accelerator opening degree signal may be normalized or the gain may be adjusted with the gear signal. In this example, the gear signal reflection section 213 is newly provided so that the gear signal 13 is reflected in the processed accelerator opening degree signal; however, it may also be allowed that the gear signal 13 is inputted to the changing amount determination section 211 so that the gear signal is reflected in the mode of the status of a change in the accelerator opening degree. Alternatively, the gear signal 13 may be inputted to the time change processing section 212 so that the gear signal is reflected in the time change processing. In Embodiment 5, as the behavior conversion processing, the gear signal 13 is reflected; however, vehicle information other than the gear signal 13 may also be reflected in the behavior conversion processing.

Due to the inertia of a vehicle, the time change and pitch change in a conventional engine sound differs depending on the gear signal. The reflection of the gear signal or other vehicle information in the behavior processing makes the notification sound fit more to the behavior of the vehicle and natural; thus, a pedestrian or the like in the vicinity of the reference vehicle can perceive the approach of the reference vehicle.

In the scope of the present invention, the embodiments thereof can be combined with one another and can appropriately be modified or omitted.

DESCRIPTION OF REFERENCE NUMERALS

1: vehicle information signal
2: sound magnification conversion processing unit
3: notification sound signal generation processing section
10: notification sound control unit
11: accelerator opening degree signal
12: vehicle speed signal
21: behavior conversion processing section
22, 220: pitch magnification calculation section
23, 230: volume magnification calculation section
211: changing amount determination section
212: time change processing section
31, 310: sound element
32, 320: pitch conversion section
33, 330: volume conversion section
34: synthesis processing section
40: sounding device
100: approaching vehicle audible system
200: electric vehicle

The invention claimed is:

1. A notification sound control unit of an approaching vehicle audible system, generating a signal for a notification sound to be emitted from a sounding device provided in an electric vehicle in which at least part of driving force is produced by an electric motor to outside of the electric vehicle, the notification sound control unit of an approaching vehicle audible system comprising:
a changing amount determination section that categorizes a status of change in an accelerator opening degree signal among vehicle information signals of the electric vehicle into a plurality of modes and determines to which mode among the categorized modes the status of the change in the accelerator opening degree signal belongs;
a behavior conversion processing section that processes the accelerator opening degree signal with a delay processing to delay the accelerator opening degree signal based on the mode determined by the changing amount determination section so as to output a processed accelerator opening degree signal; and a notification sound signal generation processing section that changes a pitch and a volume of a sound element signal outputted from a sound element, based on the processed accelerator opening degree signal, so as to generate a notification sound signal.

2. The notification sound control unit of an approaching vehicle audible system according to claim 1, wherein the plurality of modes into which the changing amount determination section categorizes the status of a change in the accelerator opening degree signal include a step-on mode in which the accelerator opening degree signal increases and a pedal-return mode in which the accelerator opening degree signal decreases.

3. The notification sound control unit of an approaching vehicle audible system according to claim 2, wherein the plurality of modes into which the changing amount determination section categorizes the status of a change in the accelerator opening degree signal include a constant mode in which the accelerator opening degree signal does not change.

4. The notification sound control unit of an approaching vehicle audible system according to claim 2, wherein the delay processing in the step-on mode performed by the behavior conversion processing section is for a shorter delay time than the delay processing in the pedal-return mode is.

5. The notification sound control unit of an approaching vehicle audible system according to claim 2, wherein in the step-on mode, the changing amount determination section further categorizes the status of a change in the accelerator opening degree signal into a plurality of modes, in accordance with a rate of the change in the accelerator opening degree signal.

6. The notification sound control unit of an approaching vehicle audible system according to claim 2, wherein in the pedal-return mode, the changing amount determination section further categorizes the status of a change in the accelerator opening degree signal into a plurality of modes, in accordance with a rate of the change in the accelerator opening degree signal.

7. The notification sound control unit of an approaching vehicle audible system according to claim 1, wherein the time delay processing performed by the behavior conversion processing section is filtering processing.

8. The notification sound control unit of an approaching vehicle audible system according to claim 7, wherein the filtering processing includes moving-average processing.

9. The notification sound control unit of an approaching vehicle audible system according to claim 1, wherein the delay processing performed by the behavior conversion processing section includes at least one of calculation processing items consisting of multiplication, division, addition, and subtraction.

* * * * *